US011592050B2

(12) United States Patent
Clark et al.

(10) Patent No.: US 11,592,050 B2
(45) Date of Patent: Feb. 28, 2023

(54) APPARATUS FOR A CAPTURED FASTENER ASSEMBLY WITH EXPANDING GROMMET

(71) Applicant: ILLINOIS TOOL WORKS INC., Glenview, IL (US)

(72) Inventors: Chad Michael Clark, Stamping Ground, KY (US); Ronald C. Owens, II, Lawrenceburg, KY (US)

(73) Assignee: Illinois Tool Works Inc., Glenview, IL (US)

( * ) Notice: Subject to any disclaimer, the term of this patent is extended or adjusted under 35 U.S.C. 154(b) by 401 days.

(21) Appl. No.: 16/728,466

(22) Filed: Dec. 27, 2019

(65) Prior Publication Data

US 2020/0217346 A1    Jul. 9, 2020

Related U.S. Application Data

(60) Provisional application No. 62/790,321, filed on Jan. 9, 2019.

(51) Int. Cl.
*F16B 13/04* (2006.01)
*F16B 21/16* (2006.01)
*F16B 41/00* (2006.01)

(52) U.S. Cl.
CPC ............ *F16B 21/16* (2013.01); *F16B 41/002* (2013.01)

(58) Field of Classification Search
CPC .. B60R 13/0846; Y10T 16/063; F16B 35/041; F16B 35/04; F16B 41/002; F16B 21/16
USPC ........................................................ 411/107
See application file for complete search history.

(56) References Cited

U.S. PATENT DOCUMENTS

| | | | | |
|---|---|---|---|---|
| 3,272,952 A | * | 9/1966 | McKeon | H02B 1/042 174/138 D |
| 3,756,551 A | | 9/1973 | Bishop | |
| 4,732,519 A | * | 3/1988 | Wagner | F16B 35/04 403/14 |
| 4,783,039 A | | 11/1988 | Peterson et al. | |
| 4,890,966 A | * | 1/1990 | Umezawa | F16B 19/1081 411/908 |
| 4,975,008 A | * | 12/1990 | Wagner | F16B 43/001 411/533 |
| 5,020,951 A | * | 6/1991 | Smith | F16B 35/041 411/533 |
| 5,094,579 A | * | 3/1992 | Johnson | F16B 35/041 411/970 |
| 5,110,081 A | | 5/1992 | Lang, Jr. | |
| 5,255,647 A | | 10/1993 | Kiczek | |

(Continued)

FOREIGN PATENT DOCUMENTS

| | | |
|---|---|---|
| CN | 103671394 A | 3/2014 |
| CN | 104903599 A | 9/2015 |

(Continued)

*Primary Examiner* — Gary W Estremsky
(74) *Attorney, Agent, or Firm* — Quarles & Brady LLP

(57) ABSTRACT

A fastener assembly that is configured to securely couple to a component includes a bolt, a limiter, and a grommet. The bold has a head, a shaft, and a medial ridge disposed around a portion of the shaft. The limiter has a brim and a tube, with the tube extending away from the brim. A grommet has a central passage extending through a top section. The top section further includes a central wall and a bottom surface. At least one tab extends from the bottom surface.

18 Claims, 13 Drawing Sheets

(56) References Cited

U.S. PATENT DOCUMENTS

| | | | | |
|---|---|---|---|---|
| 5,397,206 A * | 3/1995 | Sihon | ............... | F16F 7/00 |
| | | | | 411/970 |
| 5,513,603 A | 5/1996 | Ang et al. | | |
| 5,765,819 A * | 6/1998 | Hummel | ............... | F16F 1/3735 |
| | | | | 267/293 |
| 5,871,319 A * | 2/1999 | Schneider | ............ | F16B 5/0258 |
| | | | | 411/107 |
| 6,059,503 A | 5/2000 | Johnson | | |
| 6,142,718 A * | 11/2000 | Kroll | ............ | B60P 7/0807 |
| | | | | 410/101 |
| 6,280,132 B1 * | 8/2001 | Szczukowski | ........ | F16B 5/0258 |
| | | | | 411/107 |
| 7,771,149 B2 | 8/2010 | Bauer et al. | | |
| 7,895,709 B2 * | 3/2011 | Shishikura | ............. | B60R 13/04 |
| | | | | 411/335 |
| 8,261,409 B2 * | 9/2012 | Magennis | ............... | F16L 5/027 |
| | | | | 16/2.1 |
| 8,523,206 B2 * | 9/2013 | Degenstein | ............. | B62D 3/12 |
| | | | | 180/428 |
| 8,875,681 B2 * | 11/2014 | Kannan | ............... | F16F 1/41 |
| | | | | 123/456 |
| 8,978,201 B2 * | 3/2015 | Vess | ............... | F16C 27/02 |
| | | | | 16/DIG. 33 |
| 9,011,058 B2 | 4/2015 | Busch et al. | | |
| 9,038,239 B2 * | 5/2015 | Allen | ............... | A61L 2/26 |
| | | | | 248/346.04 |
| 9,303,679 B2 | 4/2016 | Dechant et al. | | |
| 9,341,210 B2 | 5/2016 | Hirano | | |
| 2006/0005363 A1 | 1/2006 | Reiter | | |
| 2009/0110478 A1 | 4/2009 | Schneider | | |
| 2011/0247172 A1 * | 10/2011 | Yoshii | ............... | F16B 21/073 |
| | | | | 16/2.1 |
| 2012/0192379 A1 * | 8/2012 | Amirian | ............... | F16B 9/056 |
| | | | | 16/2.5 |
| 2013/0071203 A1 | 3/2013 | Hay | | |
| 2014/0027173 A1 * | 1/2014 | Clothier | ............... | H02G 3/083 |
| | | | | 174/152 G |
| 2014/0161562 A1 | 6/2014 | Dechant et al. | | |
| 2018/0094667 A1 | 4/2018 | Clark et al. | | |

FOREIGN PATENT DOCUMENTS

| | | |
|---|---|---|
| CN | 106715928 A | 5/2017 |
| CN | 107269652 A | 10/2017 |

\* cited by examiner

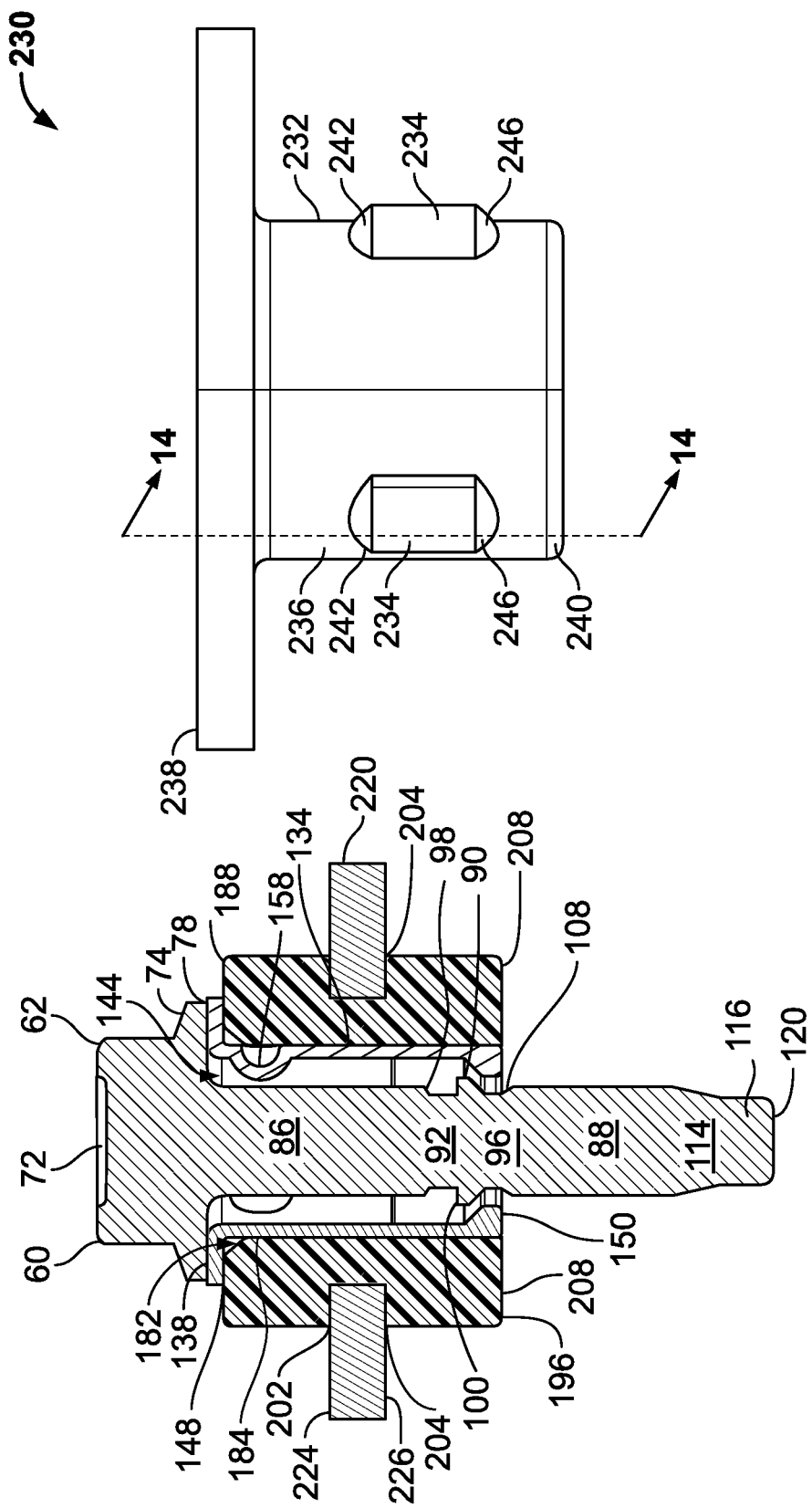

APPARATUS FOR A CAPTURED FASTENER ASSEMBLY WITH EXPANDING GROMMET

RELATED APPLICATIONS

This application claims priority benefits from U.S. Provisional Application No. 62/790,321 filed Jan. 9, 2019 and entitled "Apparatus for a Captured Fastener Assembly with Expanding Grommet," which is hereby incorporated by reference in its entirety.

BACKGROUND

The present disclosure relates to fastener assemblies. More specifically, a captured fastener is disclosed that includes a grommet having a plurality of tabs that expand.

In the field of manufacturing, fasteners are widely used for assembling components. Fasteners often penetrate a thin component having an aperture pre-fabricated for receiving a fastener. Some fasteners interact abrasively with the component when installed, causing increased stress and deformation near the aperture. This can be detrimental for some components, where integrity of the structure is needed to prevent vibration, fracturing, mechanical isolation, or even for desirable aesthetics.

One solution is to provide a grommet and bushing, such as the prior art H-style grommet and bushing depicted in FIG. 1. The highlighted prior art grommet is typically made from a rubber material, and inserted manually into an aperture within a panel so that a waist section thereof resides within the aperture. Accordingly, the prior art grommet and bushing are received as separate components requiring separate installation steps. Difficulties associated with the use of these components can arise since the components are small and, therefore, easily lost and/or damaged. Further, inserting the prior art grommet into an aperture can be cumbersome and/or require significant insertion forces and/or dexterity. These challenges can cause damaged components, excess manual labor, and/or increased costs. Further, the highlighted prior art grommets and bushing may be limited to applications with components capable of withstanding high insertion forces.

SUMMARY

In one aspect, a fastener assembly includes a bolt, a limiter, and a grommet having a plurality of tabs. The bolt has a head, a shaft, and a medial ridge disposed around the shaft. The limiter has a brim and a tube extending away from the brim. A grommet has a central passage extending through a top section. The top section further includes a central wall and a bottom surface. At least one tab extends from the bottom surface.

It is also contemplated that the at least one tab may extend at an angle from the bottom surface. The at least one tab can have a body, which includes a bottom edge, a top edge, a pair of sidewalls, an inner wall, and an arm extending between the body and the bottom surface of the grommet. The body may be positioned inward relative to the central wall. The inner wall can be curvilinear and continuous across the arm and the body. The limiter may also include an inner passage that extends through the tube. The grommet can include a central passage and a top section. The top section of the grommet may further include a central wall and a bottom surface. Accordingly, the fastener assembly provides noise, vibration, and/or material isolation on two sides of a structure, e.g., an engine cover.

In other examples, the medial ridge of the bolt further includes a first groove and a second groove. The limiter can further include a bolt capturing mechanism, which can be, for example, a plurality of nibs or a plurality of intrusions and lobes formed by or along a crimped section. In one embodiment, the bolt capturing mechanism comprises at least one nib disposed on an inner surface. The limiter may further include a grommet capturing mechanism, which can be, for example, a crimped section having a plurality of lobes or a plurality of ribs. In one embodiment, the grommet capturing mechanism comprises at least one rib disposed on an outer barrel surface of the limiter. Additionally, the grommet capturing mechanism of the limiter may include a lower lip positioned at a lower end for interacting with an upper rim disposed in a grommet. Further, the lower lip may be positioned at a lower end opposite the brim that is configured to interact with an upper rim disposed inside the central passage of the grommet.

In another aspect, a fastener assembly comprises a grommet, a limiter, and a fastener. The grommet includes a top section with a top surface and a central passage defined by a central wall. The limiter includes a barrel and a flange, wherein the barrel has an inner passage. The fastener includes a shaft, wherein the fastener is configured to be received and retained within the inner passage of the limiter. The barrel is configured to be received and retained by the central passage of the grommet. The combination of the grommet, the limiter, and the fastener is configured to be received by a component in a pre-fastened state.

The grommet can further include a plurality of tabs that each have an inner wall positioned below a central wall of the central passage. The grommet can further include at least one ridge extending vertically within the central passage and along the central wall. The at least one ridge can extend along the inner wall of each of the plurality of tabs. The top section of the grommet can include a washer disposed therein. A retainer may also be disposed around the shaft of the fastener, and the retainer can have at least one thick panel and at least one thin panel. The retainer can be disposed inside the inner passage of the limiter. A component, to which the fastener assembly may be securely coupled, can include a well that is configured to receive the fastener assembly. The well can include an upper pocket and a lower pocket.

In yet another aspect, a fastener assembly includes a bolt having a head and a shaft. The shaft includes a collar disposed around the shaft. The fastener assembly also includes a grommet including a top section and a central passage extending through the top section. The fastener assembly further includes a tube. The tube has a flange disposed at a top end. The limiter further includes a plurality of protuberances projecting inwardly from an inner surface of the tube. The grommet further includes a plurality of tabs disposed below the top section. The top section of the grommet is configured to couple to a top surface of a component and the plurality of tabs are configured to couple to a bottom surface of the component.

In still another aspect, a method for installing a fastener assembly that includes a bolt, a limiter, and a grommet having a plurality of tabs includes the following steps: (a) inserting a portion of the grommet into an aperture in a panel, (b) exerting a downward force on a head of the bolt, wherein the plurality of tabs flare outward as a result of the downward force; (c) engaging the head of the bolt into contact with the grommet as a result of the downward force; and (d) engaging a portion of the plurality of tabs with the panel. The fastener assembly may be shipped in an assembled state with the panel. The bolt of the fastener assembly can be configured to be tightened beyond the assembled state, with the bolt exerting compression onto the grommet, thereby locking the fastener assembly and the panel into a final position.

DESCRIPTION OF THE DRAWINGS

FIG. 11 is an cross-sectional view similar to FIG. 9, with the fastener assembly in an assembled state;

FIG. 12 is an elevational view of a front side of another embodiment of a limiter for a fastener assembly;

DETAILED DESCRIPTION

Figure 1:
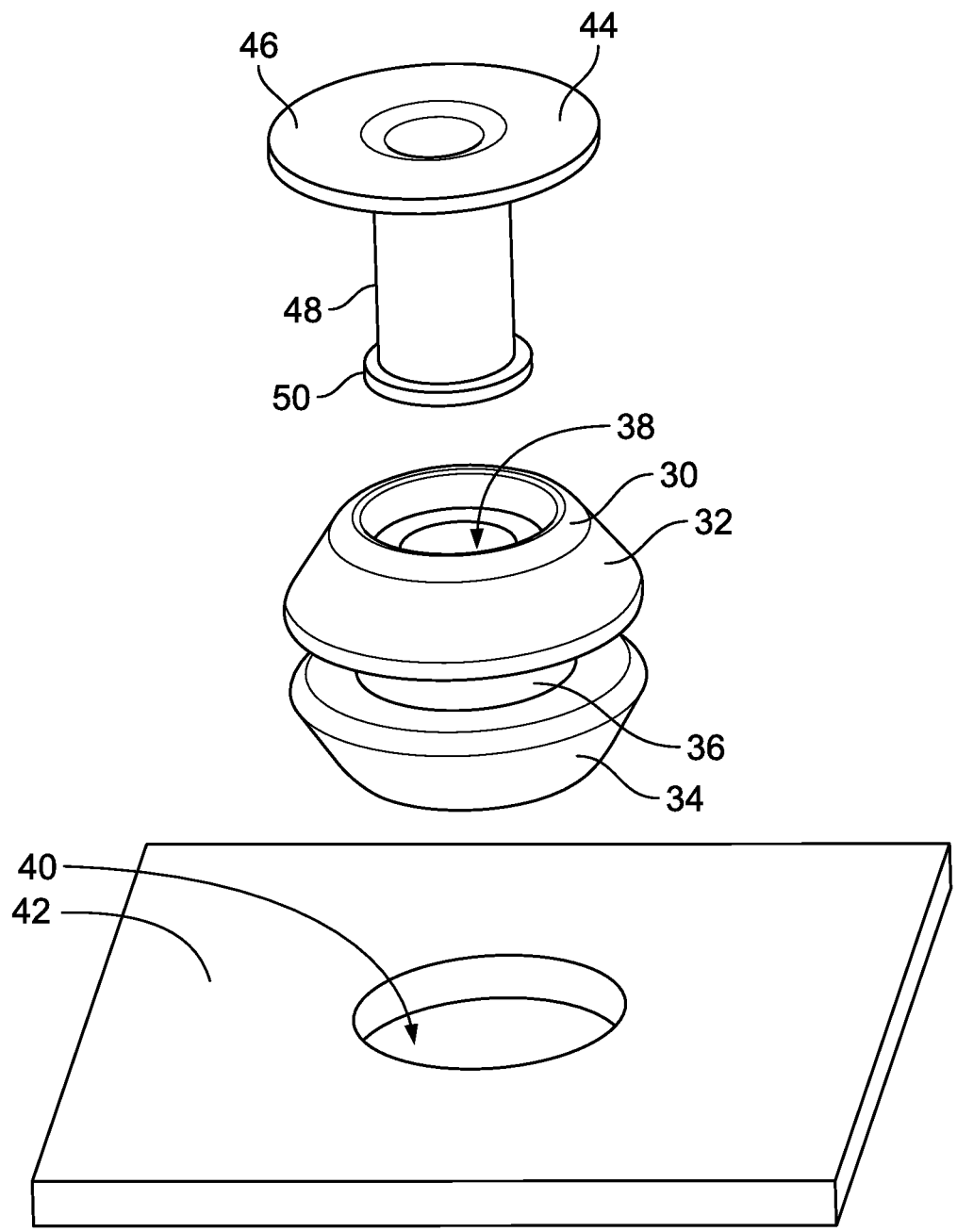
FIG. 1 is an exploded, isometric view of a prior art H-style grommet, bushing, and panel having an aperture.

Referring to FIG. 1, a prior art H-style grommet 30 is depicted having a first plug 32 and a second plug 34 attached on opposing ends of a midsection 36. The midsection 36 is configured to have a smaller diameter than either of the first and second plugs 32, 34. Additionally, the H-style grommet 30 includes a grommet hole 38 extending through the first plug, 32, the midsection 36, and the second plug 34. During installation, either the first plug 32 or the second plug 34 is plunged through an opening 40 in a structure 42, which is typically performed manually by a user. Because the diameters of the first plug 32 and the second plug 34 are configured to be slightly greater than the diameter of the opening 40, insertion of the H-style grommet 30 incurs significant resistance. As a result, dexterity, time, and repeated attempts to install are often associated with such insertion methods.

Still referring to FIG. 1, a prior art bushing 44 is shown, which comprises a bushing flange 46 connected by a bushing tube 48 to a bushing protuberance 50. The bushing 44 is shown prior to insertion into the H-style grommet 30 through the grommet hole 38. Before insertion of the bushing 44 into the grommet 30, the H-style grommet 30 is inserted into the opening 40. Installation of the bushing 44 and grommet 30 typically require linear and distinct installation steps, i.e., one must follow the other, and may lead to lost or damaged components due to the small size of each component and high insertion forces involved. As a result, inefficiency and increased costs tend to correlate with use of such components.

Figure 2:
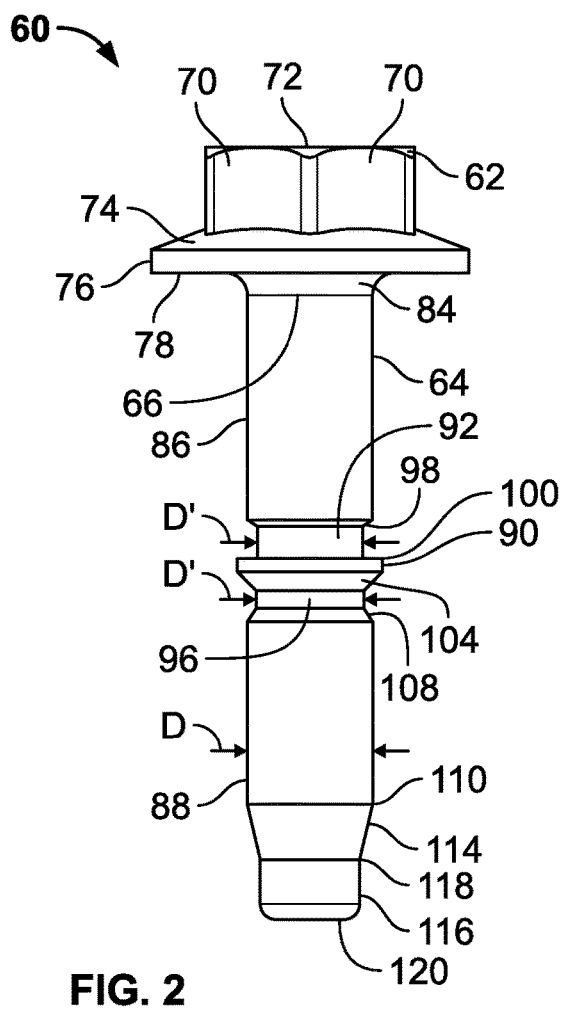
FIG. 2 is an elevational view of a side of a bolt for a fastener assembly.

Now referring to FIG. 2, a bolt 60 is depicted, the bolt 60 comprising a head 62 attached to a shaft 64 at an upper end 66 of the shaft 64. The head 62 includes a plurality of head walls 70 surrounding a torque transmitting surface 72 and extending vertically away from a flange top 74. The torque transmitting surface 72 and the plurality of head walls 70 together are configured to receive a wide variety of tools, such as a wrench or a screwdriver. The flange top 74 is a curvilinear surface disposed adjacent a flange sidewall 76 and also disposed opposite a flange bottom 78. The flange sidewall 76 is a rounded, vertical surface located between the flange top 74 and the flange bottom 78. The flange bottom 78 is a generally flat surface formed around a neck 84 that connects the head 62 to the shaft 64. The head 62 is configured to interact with a tool for insertion, rotation, or extraction. It is contemplated that the plurality of head walls 70 may include six walls for transmitting torque from a tool (not shown) to the head 62. Alternatively, the plurality of head walls 70 may include fewer walls, such as five, four, or even three walls, to receive a variety of well-known tools used in the manufacturing industry.

Still referring to FIG. 2, the shaft 64 is a tubular body extending away from the neck 84 and includes an upper section 86, a lower section 88, and a medial collar 90 that is provided between a first groove 92 and a second groove 96 of the shaft 64. The first and second grooves 92, 96 are positioned between the upper section 86 and the lower section 88. The upper section 86 of the shaft 64 has a similar diameter D as the lower section 88, which is greater than a diameter D' of both the first and second grooves 92, 96. The first groove 92 is defined between a first beveled edge 98, formed adjacent the upper section 86, and a collar stage 100. The collar stage 100 is a generally flat surface formed around the top of the medial collar 90. The second groove 96 is defined between a collar cut 104 and a second beveled edge 108, formed adjacent the lower section 88. The collar cut 104 is generally a curvilinear surface circumscribing the medial collar 90.

Still referring to FIG. 2, the lower section 88 has a baseline 110 adjacent a base edge 114, with the baseline 110 forming a boundary between the lower section 88 and the base edge 114 of the shaft 64. The base edge 114 extends from the baseline 110 and gradually narrows in diameter toward a foot 116 having foot end 118. The foot 116 has a smaller diameter than both the lower section 88 and the baseline 110, with the foot end 118 forming an upper boundary of the foot 118 and a leading end 120 forming a lower boundary of the foot 116.

It is contemplated that the bolt 60 may have threading disposed along at least a portion of the shaft 64. Further, the upper section 86 and the lower section 88 may be of varying heights and diameters, and can include additional grooves beyond the first and second grooves 92, 96. Also, the leading end 120 may be rounded, sharpened, angled, or formed in another suitable shape.

Figure 3:
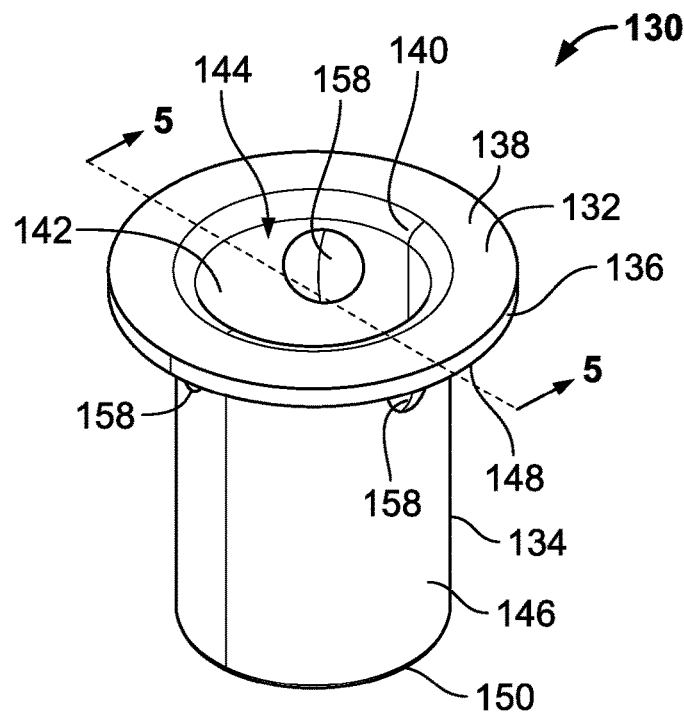
FIG. 3 is an isometric view of a top and side of an embodiment of a limiter for a fastener assembly.

Referring to FIG. 3, a limiter 130 is depicted having a brim 132 disposed adjacent an upper end of a limiter tube 134. The brim 132 has a cylindrical brim side 136 disposed adjacent a brim top surface 138. The brim top surface 138 is adjacent a round 140 that is generally rounded and concentrically disposed within the brim 132. The round 140 resides above an inner tube surface 142 that extends vertically away from the brim 132 to form an inner passage 144. Also, the limiter tube 134 has an outer tube surface 146 that is parallel to the inner tube surface 142, where the outer tube surface 146 extends between a brim bottom surface 148 and a bottom tube edge 150. Accordingly, the brim 132 is coupled to the limiter tube 134 at an end that is opposite the end having the bottom tube edge 150.

Figure 4:
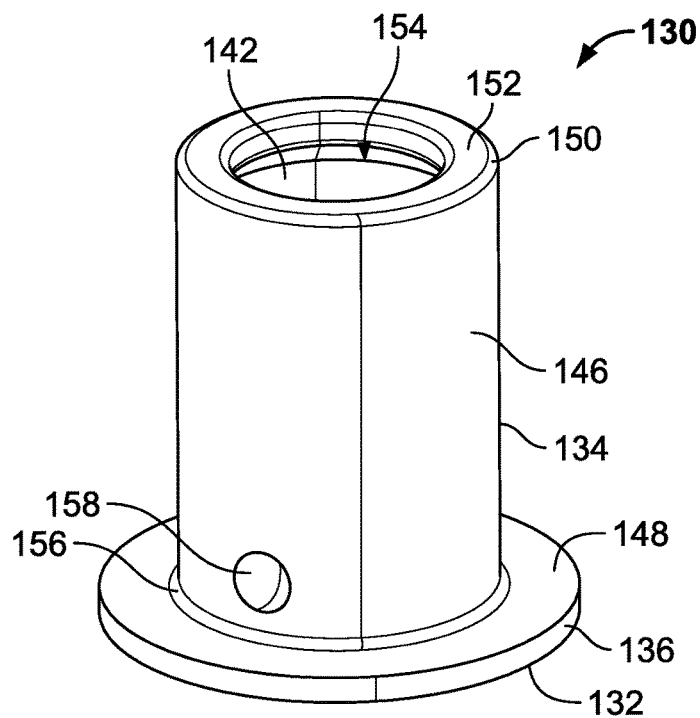
FIG. 4 is an isometric view of a bottom and side of the limiter of FIG. 3.

Now referring to FIG. 4, the bottom tube edge 150 is depicted more clearly. The bottom tube edge 150 includes a bottom tube surface 152 that is flat and circular, intersected by a bottom tube aperture 154. The bottom tube aperture 154 is concentric with the inner passage 144 of the limiter tube 134, allowing the shaft 64 of the bolt 60 to pass through it during use, as will be described in greater detail hereinafter below. Further, the outer tube surface 146 extends between the bottom tube edge 150 and the brim bottom surface 148. The connection between the brim bottom surface 148 and the outer tube surface 146 is formed by a tube neck 156, annularly disposed at an upper end of the limiter tube 134. The brim bottom surface 148, the brim side 136, and the brim top surface 138 together form the brim 132 of the limiter 130.

Figure 5:
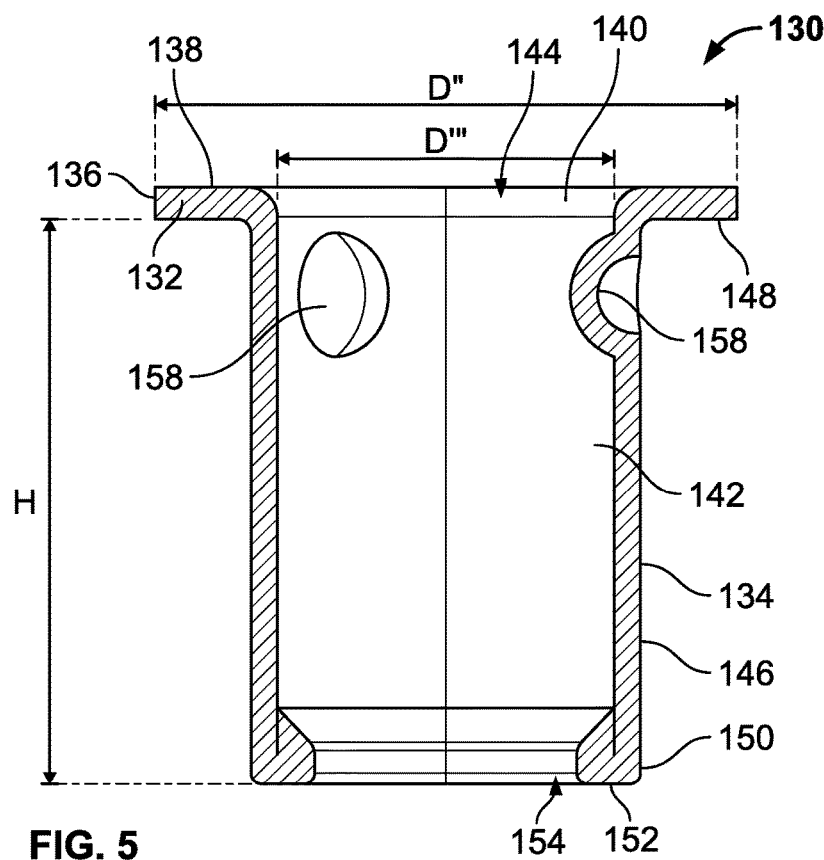
FIG. 5 is a cross-sectional view taken along lines 5-5 of the limiter of FIG. 3.
Figure 9:
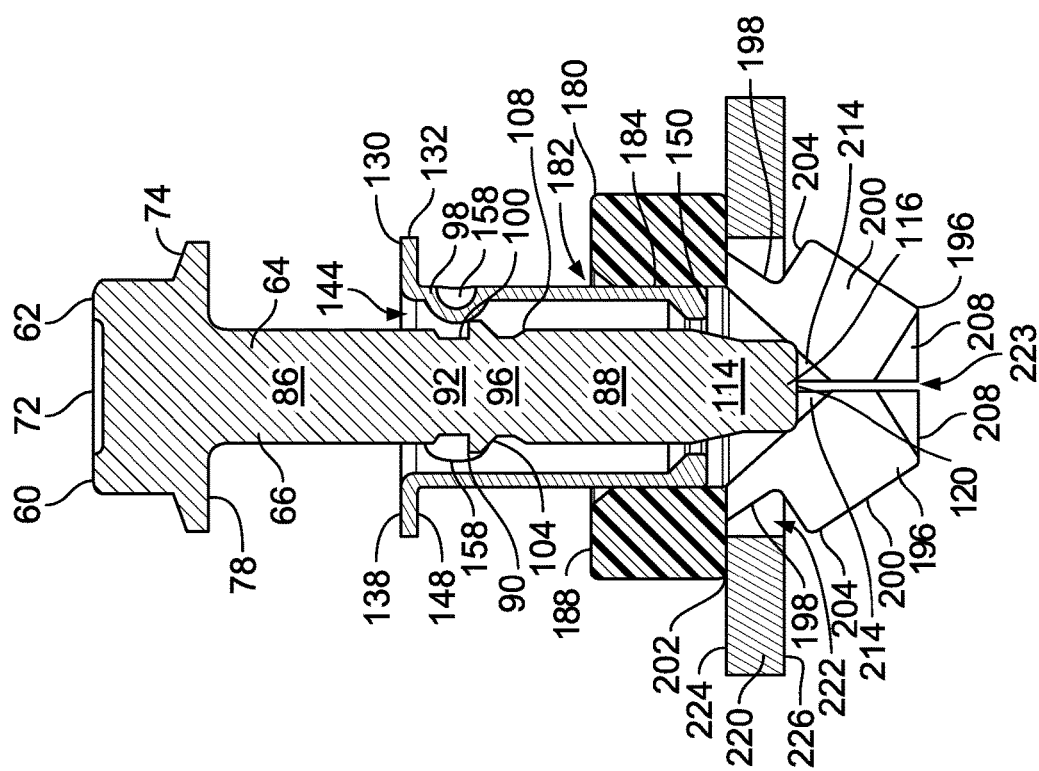
FIG. 9 is a cross-sectional view taken along lines 9-9 of the fastener assembly of FIG. 8 further depicting a panel having an aperture.

FIG. 5 depicts a sectional view of the limiter 130. The inner passage 144 of the limiter tube 134 is configured to receive the shaft 64 of the bolt 60. To promote this interaction, the inner tube surface 142 and the outer tube surface 146 include a plurality of nibs 158 positioned between the brim 132 and the bottom tube edge 150. The plurality of nibs 158 are formed as curvilinear bumps protruding into the inner passage 144 of the limiter tube 134. The plurality of nibs 158 are configured to interact with the medial collar 90 of the bolt 60, as illustrated in FIG. 9. As such, the plurality of nibs 158 are configured to project into the inner passage 144 to a depth sufficient for retaining the bolt 60 within the limiter 130. With reference again to FIG. 5, the brim side 136 has a diameter D" that is greater than a diameter D"' of the limiter tube 134. In addition, the limiter tube 134 has a height H, defined between the brim bottom surface 148 and the bottom tube surface 152.

The nibs 158 may be formed by deforming the outer tube surface 146 and the inner tube surface 142 to create a semi-circle, for example, with a machine press having a rounded tip. In addition, the plurality of nibs 158 may include three nibs 158, as depicted in FIG. 3. It is contemplated that the plurality of nibs 158 may be formed in a different manner, such as by 3D printing, additive manufacturing, or other suitable manufacturing means. Further, the plurality of nibs 158 may include greater or fewer nibs 158 disposed about the limiter tube 134, such as two, four, five, or even six nibs. In addition, the plurality of nibs 158 may be formed from a different material than the limiter tube 134, and may comprise a polymer, an alloy, or a composite material. Further, the plurality of nibs 158 can be positioned farther from or closer to the bottom tube edge 150 than depicted herein.

Figure 6:
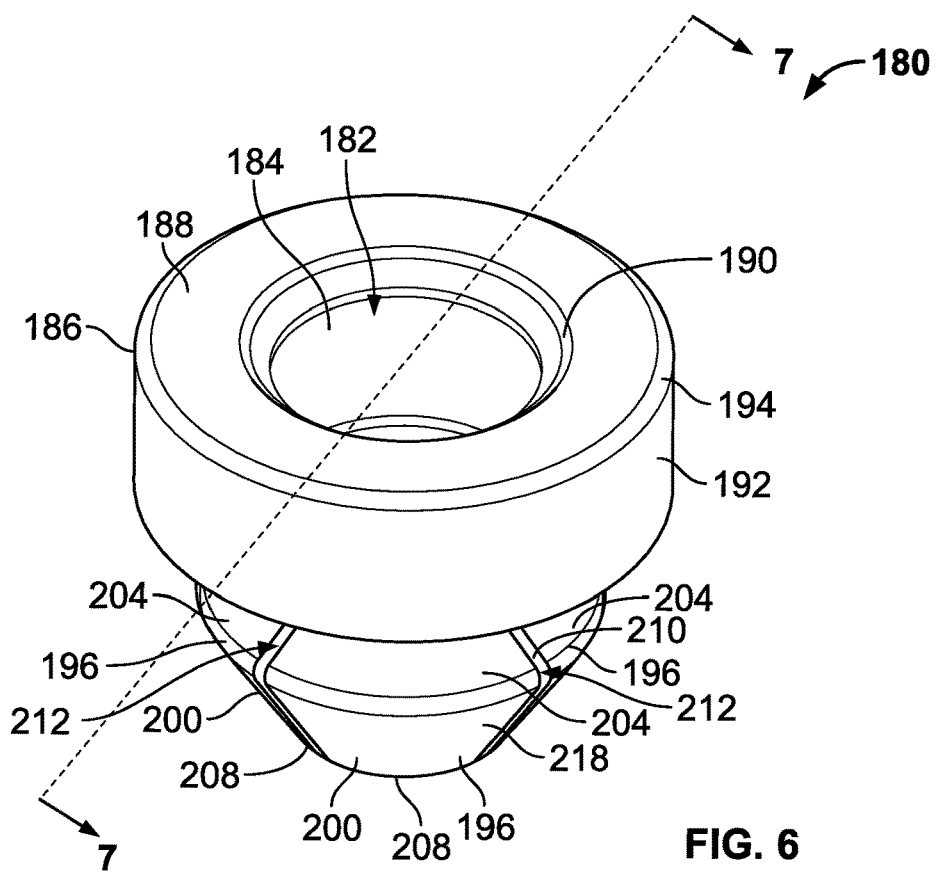
FIG. 6 is an isometric view of a grommet for a fastener assembly.

Referring now to FIG. 6, an embodiment of a grommet 180 is illustrated, the grommet 180 having a central passage 182 defined by a central wall 184 within a grommet top section 186. The grommet top section 186 includes a grommet top surface 188 extending in a circular manner about a central ring 190, which is disposed concentrically along the grommet top section 186. The central ring 190 extends from the grommet top surface 188, and is angled downward in a curvilinear fashion toward the central wall 184 of the central passage 182. The grommet top section 186 further includes exterior wall 192 opposing the central wall 184, with the exterior wall 192 positioned adjacent a top round 194 of the grommet top surface 188. The top round 194 of the grommet top surface 188 is concentrically disposed around the outside of the grommet top surface 188. A plurality of tabs 196 are formed below the grommet top section 186.

Figure 7:
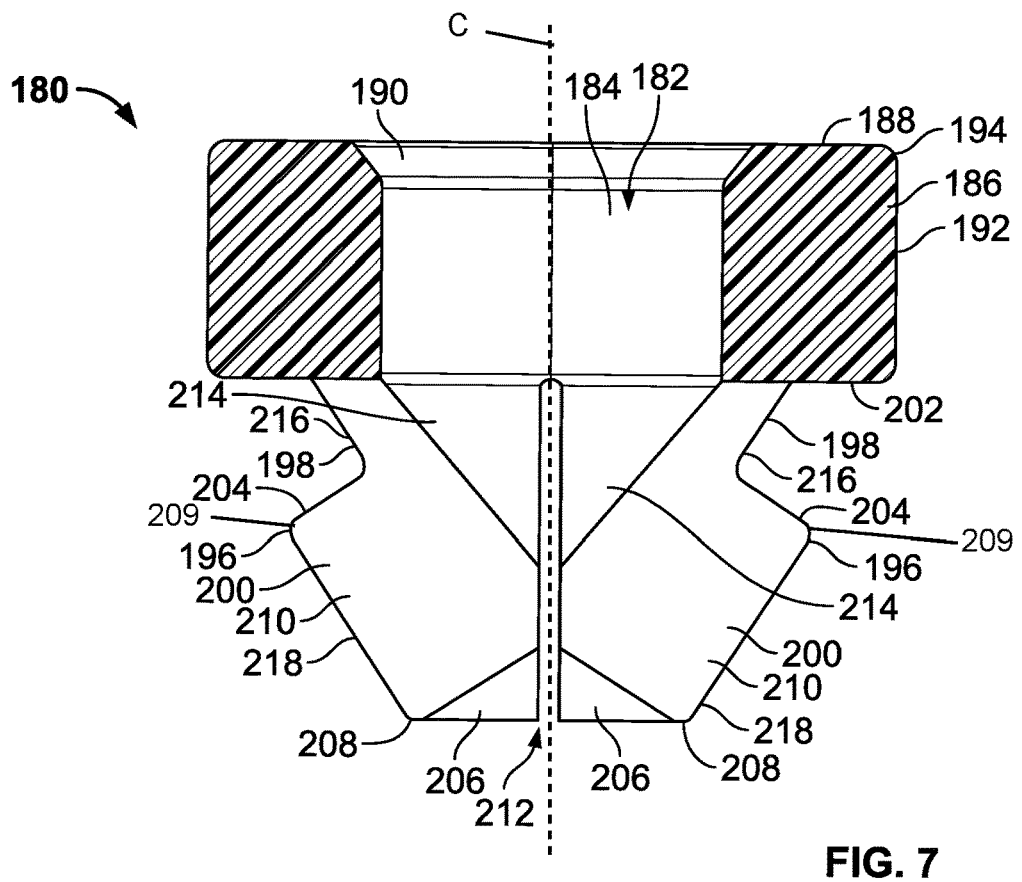
FIG. 7 is a cross-sectional view taken along lines 7-7 of the grommet of FIG. 6.

As illustrated in FIG. 7, each tab 196 has an arm 198 and a body 200, wherein the arm 198 is attached to the grommet top section 186 at a grommet bottom surface 202. Each arm 198 connects the grommet bottom surface 202 with the associated body 200 of each tab 196. As illustrated, the arm 198 extends away at an angle from the grommet bottom surface 202 inwardly, e.g., toward a central axis C defined by the grommet 180 and extending through the central passage 182, and toward a tab top end 204, which is disposed generally perpendicular to the arm 198 and opposite a tab bottom end 206. The tab bottom end 206 includes a tab bottom edge 208 that is positioned below and inwardly of a tab top edge 209 of the tab top end 204. Further, each tab 196 has a pair of tab sidewalls 210. The plurality of tabs 196 are separated by splits 212 located adjacent each tab sidewall 210, such that each tab sidewall 210 faces and is opposing the tab sidewall 210 of another tab 196. Each split 212 extends vertically from the grommet bottom surface 202 downward and adjacent each tab 196.

Still referring to FIG. 7, the arm 198 and body 200 of the tab 196 share a tab inner wall 214, depicted here in a triangular shape that narrows to a point between the bottom surface 202 and the body 200. The tab inner wall 214 is disposed at an angle relative to the central wall 184, such that the body 200 of each tab 196 is positioned inward from the central wall 184 and, thus, the tab bottom end 206 is disposed inwardly, e.g., closer to the central axis C, relative to the tab top end 204. The tab inner wall 214 is curvilinear and continuous on each tab 196. In addition, the tab bottom end 206 of each tab 196 is depicted as a rounded, quarter-circle that is also curvilinear and continuous. Each tab 196 further includes an outer arm surface 216 and an outer body surface 218 that are intersected by the tab top end 204 therebetween. The grommet 180 and the plurality of tabs 196 are configured to interact with the bolt 60 and the limiter 130, as will be described hereinafter below.

Figure 8:
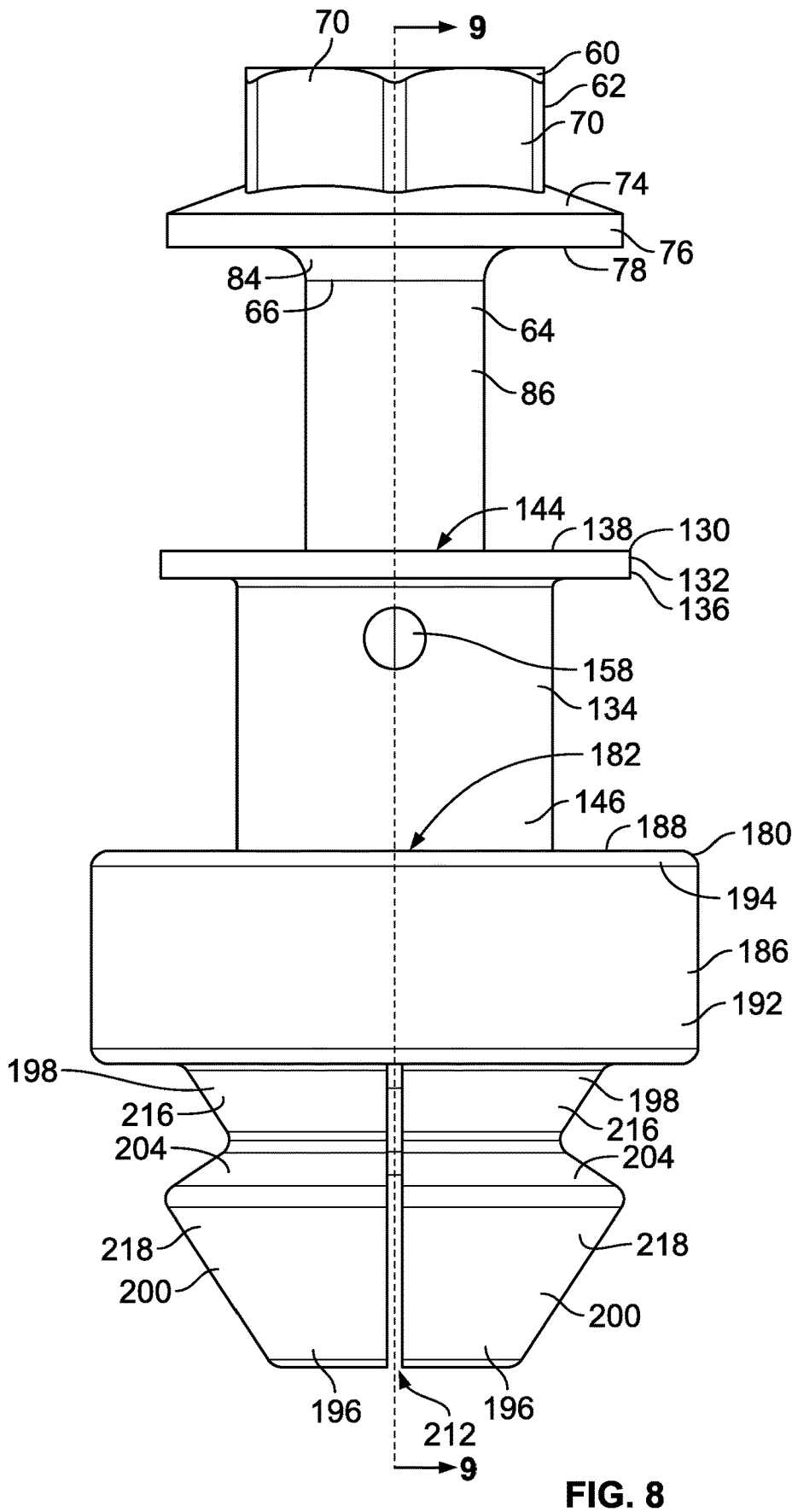
FIG. 8 is an elevational view of a fastener assembly in a pre-assembly state.

Referring now to FIG. 8, the bolt 60, the limiter 130, and the grommet 180 are depicted in a pre-assembled state. The shaft 64 of the bolt 60 is inserted through the inner passage 144 of the limiter tube 134, and together the bolt 60 and the limiter 130 are inserted into the central passage 182 of the grommet 180. Here, only a portion of the upper section 86 of the shaft 64 is visible protruding above the brim 132. Thus, the shaft 64 is not yet fully inserted into the limiter tube 134.

Figure 10:
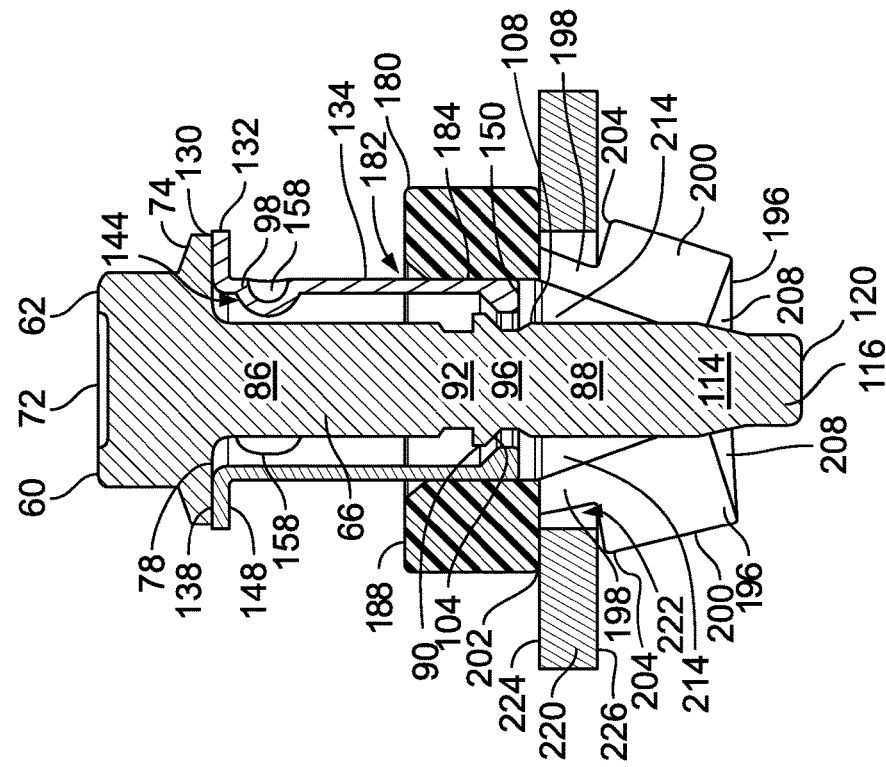
FIG. 10 is a cross-sectional view similar to FIG. 9, with the fastener assembly in an intermediate assembly state.

As can be appreciated from FIGS. 9-11, further assembly steps depict the installation of the bolt 60, the limiter 130, and the grommet 180 to a panel 220 having an aperture 222 therein. In FIG. 9, the shaft 64 is inserted to a similar depth as illustrated in the pre-assembly state of FIG. 8. To achieve this pre-assembly state, a user inserts the leading end 120 of the shaft 64 of the bolt 60 into the inner passage 144 of the limiter tube 134. The user exerts a downward force on the head 62 of the bolt 60 in order to push the medial collar 90 beyond the interference fit exerted by the plurality of nibs 158 disposed on the limiter tube 134. Illustratively, the medial collar 90 is depicted protruding beyond the diameter D of the shaft 64, which provides a threshold force to overcome before reaching the pre-assembly state depicted herein. The plurality of nibs 158 interact with the first groove 92, the first beveled edge 98, and the collar stage 100 to retain the bolt 60 in its vertical and concentric position. The leading end 120 of the shaft 64 contacts the tab inner wall 214 of the plurality of grommet tabs 196.

At this pre-assembly state, the limiter tube 134 is inserted partially into the central passage 182 of the grommet 180, just above the panel 220. Thus, the bolt 60, the limiter 130, and the grommet 180 are coupled to each other such that they can move together by grasping at least one of such components. Also, the grommet bottom surface 202 has been pressed down to contact a first panel side 224. Accordingly, the plurality of tabs 196 extend through the aperture 222 of the panel 220, and each body 200 is subsequently positioned below a second panel side 226. Each arm 198 is positioned within the aperture 222 of the panel 220, but without contacting the panel 220 itself.

Next, as depicted in FIG. 10, an intermediate assembly state includes the foot 116 of the shaft 64 protruding below the plurality of tabs 196. A user can exert an additional or greater downward force to bring the head 62 of the bolt 60 into contact with the brim 132 of the limiter 130. In particular, the flange bottom 78 contacts the brim top surface 138 to prevent further insertion of the shaft 64 into the inner passage 144 of the limiter tube 134. The downward force applied to the head 62 must overcome the resistance offered by the interaction of the plurality of nibs 158 with the first beveled edge 98. The plurality of nibs 158 now interact with the upper section 86 of the shaft 64 to provide stability for the bolt 60. Further, the collar cut 104 of the medial collar 90 is positioned adjacent the bottom tube edge 150.

Still referring to FIG. 10, the plurality of tabs 196 have been pushed outwards, in a flaring pattern, away from and by the foot 116 and base edge 114. Accordingly, the leading end 120 and the shaft 64 of the bolt 60 travel downward through the splits 212. This flaring or expanding is permitted by each arm 198 and the elastomeric material properties thereof. As can be appreciated by FIGS. 9 and 10, the limiter tube 134 is still partially inserted into the central passage 182 of the grommet 180 at this intermediary assembly state, and the bottom tube edge 150 remains positioned above the first panel side 224 and the aperture 222. As such, each arm 198 is still residing within the aperture 222 without contacting the panel 220.

Finally, FIG. 11 illustrates an assembled state with the limiter tube 134 now fully inserted through the central passage 182 of the grommet 180. The central wall 184 now aligns with the tab inner walls 214 that have flared outward to form a straight line therealong, as depicted in FIG. 11. The tab top end 204 contacts the second panel side 224, and each outer arm surface 216 contacts the panel 220 within the aperture 222. As a result, the grommet 180 is positioned to retain the bolt 60 and the limiter 130 with the panel 220. The lower section 88 and the foot 116 of the shaft 64 both extend below the tab bottom edge 208. Similarly, the bottom tube edge 150 is now aligned with the tab bottom edge 208, indicating that the assembled state has been achieved.

The fastener assembly may alternatively include a retaining nut that securely clamps a fastener to the brim 132 of the limiter 130. U.S. patent application Ser. No. 15/691,848, entitled "Fastener Assembly Having One or More Grommets," which is assigned to Illinois Tool Works Inc., of Glenview, Ill., and is hereby incorporated by reference in its entirety, discloses a fastener assembly in, for example, FIGS. 9A and 9B that includes a retaining nut that securely clamps the head of a fastener to the flange of the bushing or limiter. The retaining nut includes an interior ledge that securely clamps over an outer radial edge of the head. The ledge connects to an outer circumferential clip through a circumferential annular wall. The clip securely attaches underneath an outer edge of the flange. In this manner, the retaining nut securely couples the fastener to the bushing or limiter. In some embodiments, the retaining nut is free spinning when retained, and therefore may be used, for example, with a threaded rod or a stud as an alternative to a bolt 60.

Illustratively, as depicted in FIG. 12, another embodiment of a limiter 230 may include a barrel 232 having a plurality of ribs 234 disposed around an outer barrel surface 236 and positioned between a barrel flange 238 and a bottom barrel edge 240. The plurality of ribs 234 can have elliptical shapes with a rounded upper portion 242 and a rounded lower portion 246. When the plurality of ribs 234 are inserted into the central passage 182 of the grommet 180 they can increase the friction and retention forces offered by the central wall 184 and tab inner walls 214. In this manner, the grommet 180 is more securely captured by the plurality of ribs 234.

Figure 13:
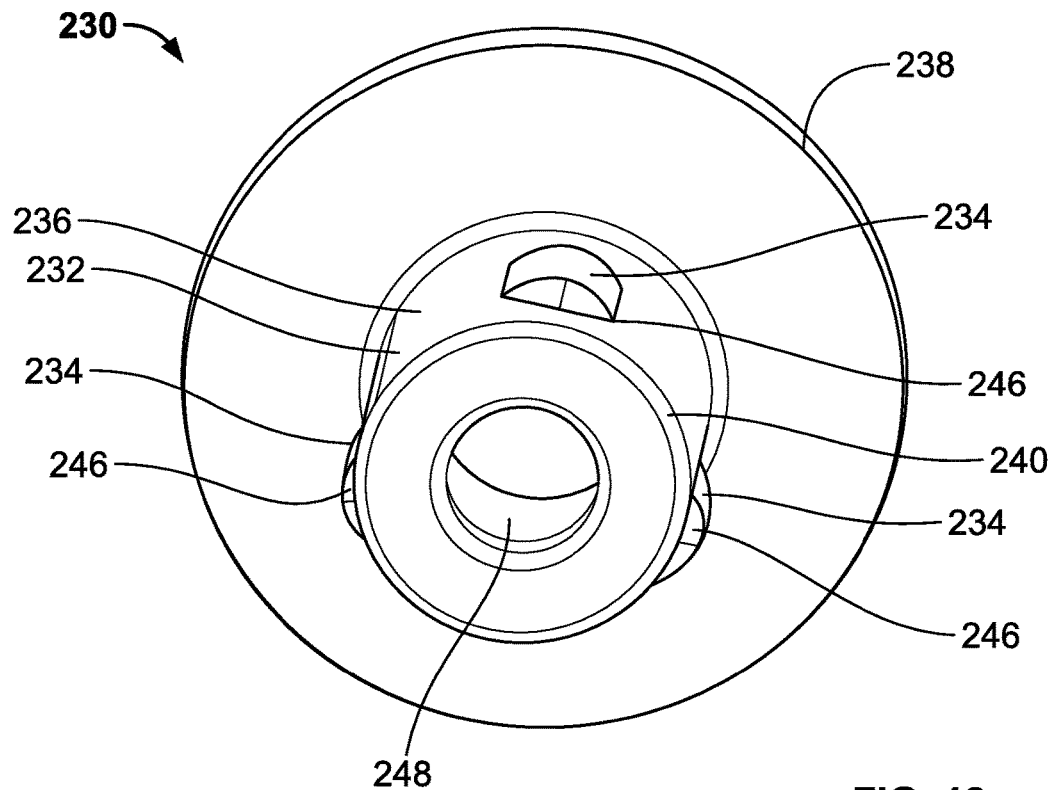
FIG. 13 is an isometric view of a bottom and right side of the limiter of FIG. 12.
Figure 14:
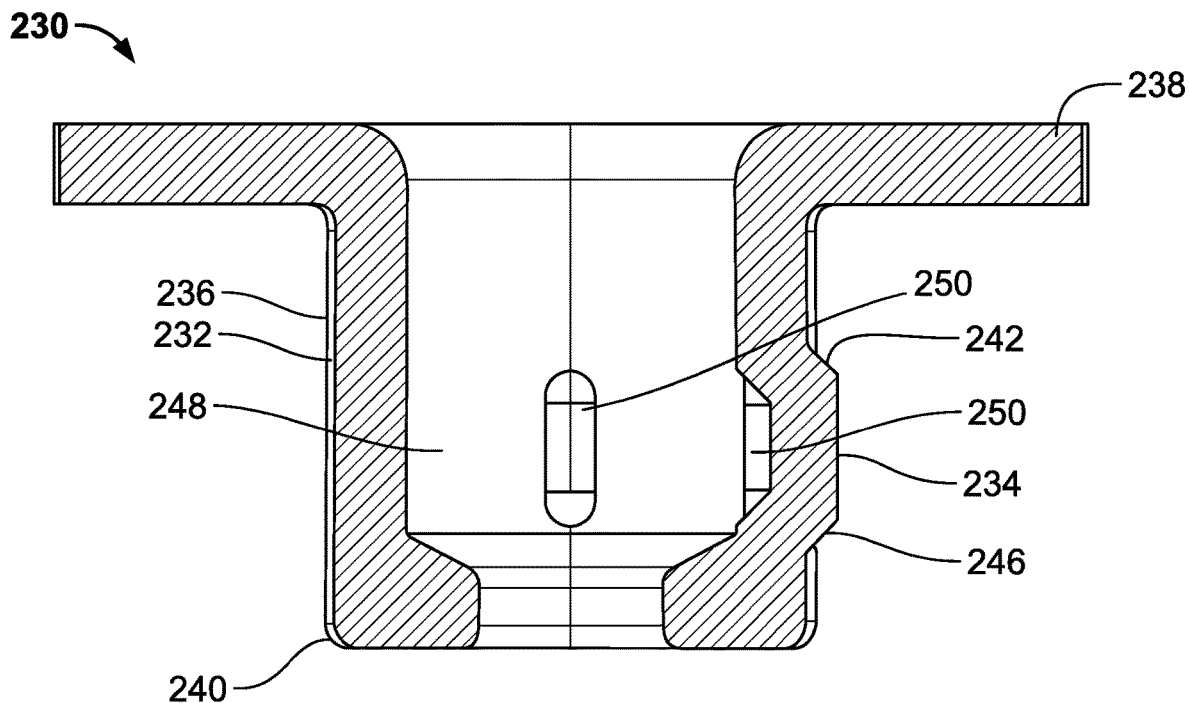
FIG. 14 is a cross-sectional view taken along lines 14-14 of the limiter of FIG. 12.

Referring to FIG. 13, in some embodiments the plurality of ribs 234 can be provided in addition to a plurality of nibs (not shown) disposed on an interior barrel surface 248. It is contemplated that three ribs 234 may be provided on the outer barrel surface 236, as shown in FIG. 13. Alternatively, any number of ribs 234 may be provided on the outer barrel surface 236 to promote increased friction and retention between the grommet 180 and the limiter 130. As illustrated in FIG. 14, each of the plurality of ribs 234 can be created or formed with a rib cavity 250.

Figure 15:
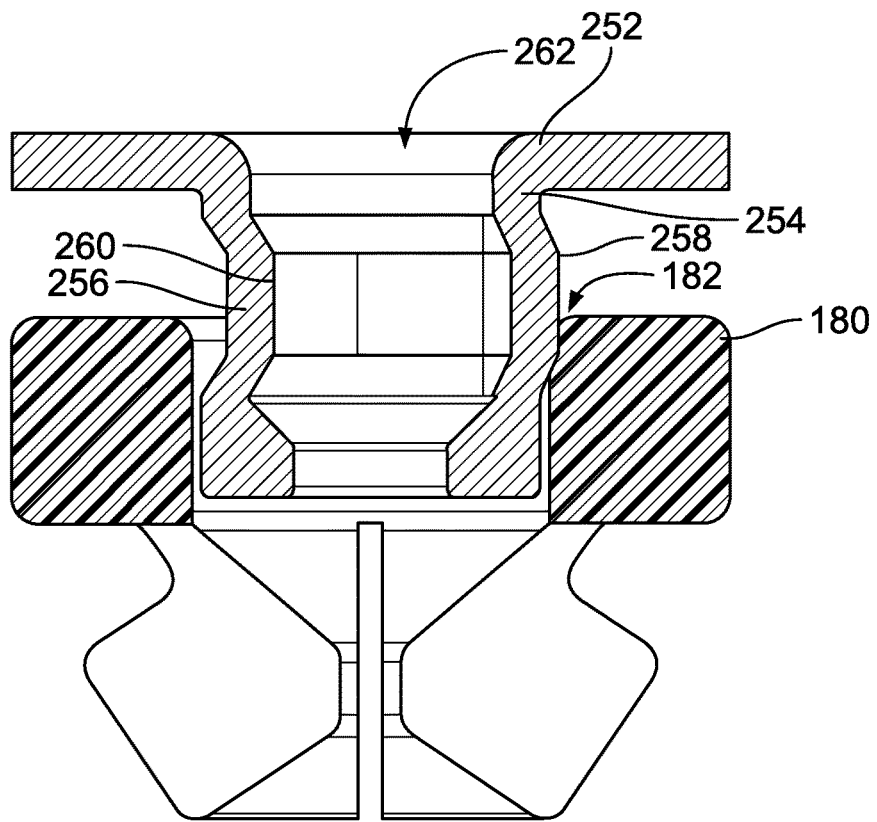
FIG. 15 is a cross-sectional view of another embodiment of a limiter for a fastener assembly, the limiter being partially inserted into a grommet.

Now referring to FIG. 15, still another embodiment of a limiter 252 can include a drum 254 with a crimped section 256 having a plurality of lobes 258 and intrusions 260 therealong. The plurality of intrusions 258 protruding from the drum 254 and disposed radially within a drum passage 262 can provide an interference fit for the shaft 64 of the bolt 60 inserted through the drum passage 262 that extends fully through the limiter 252. Also, the plurality of lobes 258 protruding from the drum 254 and disposed radially around the crimped section 256 can increase friction and retention forces experienced while the drum 254 is inserted through the central passage 182 of the grommet 180. In this manner, the crimped section 256 increases the retention of both the bolt 60 and the grommet 180 with the limiter 252.

Figure 16:
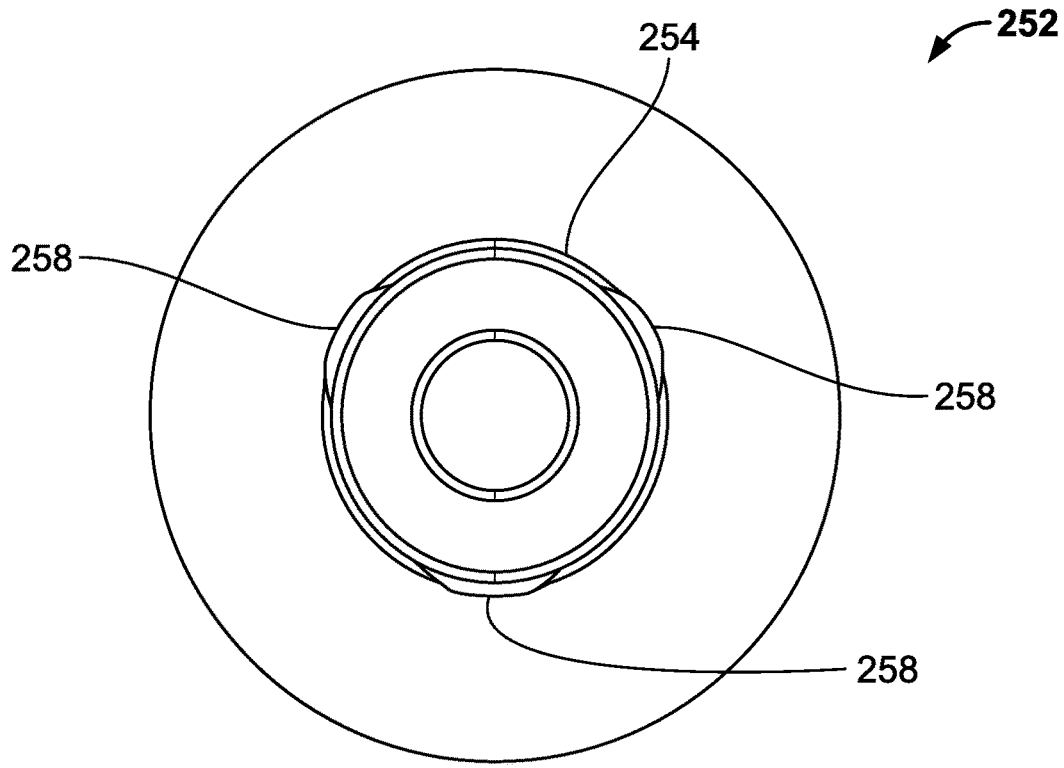
FIG. 16 is a bottom plan view of the limiter of FIG. 15.

With reference to FIG. 16, three of the lobes 258 are depicted around the drum 254 due to the crimped section 256 being formed into a triangular shape as illustrated from this bottom plan view. It is contemplated that a greater number of lobes 258 can be created by the crimped section 256 being formed into a different shape, such as a square or a hexagon. In a similar manner, the number of intrusions 260 (seen in FIG. 15) that interact with the shaft 64 of the bolt 60 may be increased or decreased by varying the shape of the crimped section 256.

Figure 17:
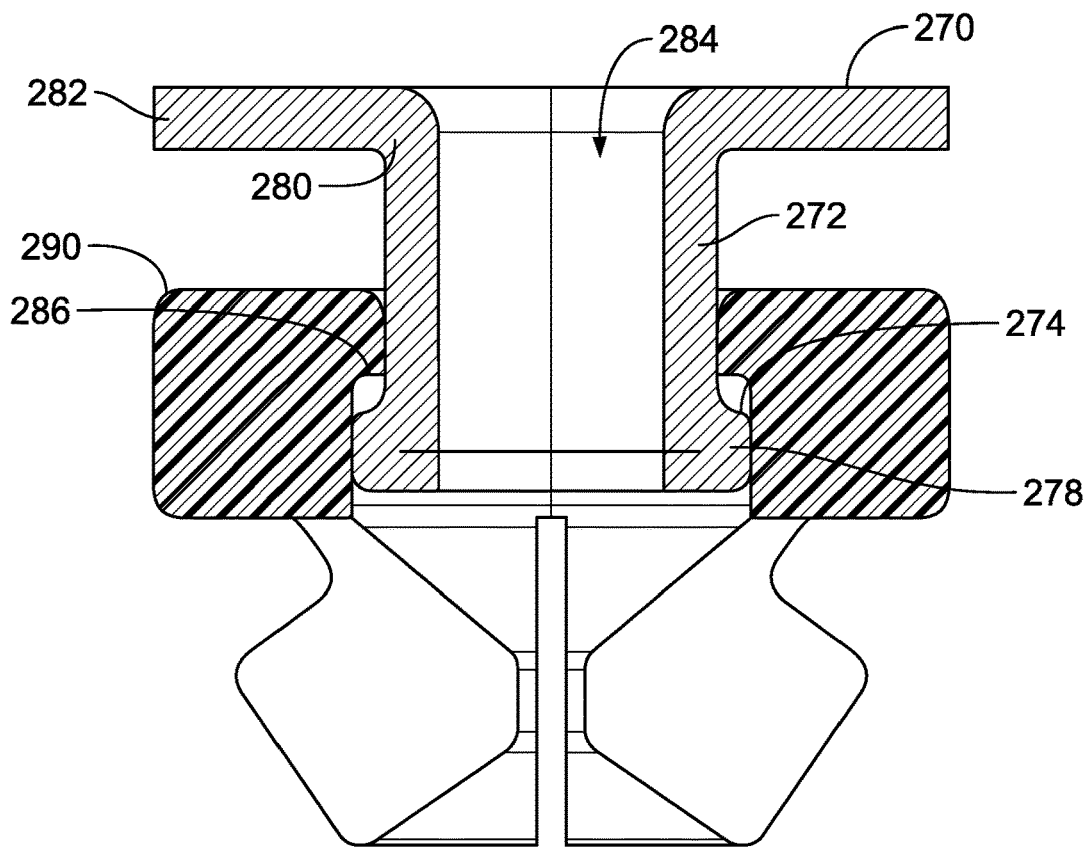
FIG. 17 is a cross-sectional view of yet another embodiment of a limiter for a fastener assembly, further including another embodiment of a grommet.

Referring to FIG. 17, yet another embodiment of a limiter 270 can include a tubular section 272 having a lower lip 274. The lower lip 274 extends outward from the tubular section 272 in a continuous, annular structure. The lower lip 274 is positioned at a lower tubular end 278 of the tubular section 272, opposite the upper tubular end 280. A tubular flange 282 extends outwardly from the upper tubular end 280. The tubular flange 282 is generally of a greater diameter than the lower lip 274, between which a tubular passage 284 is formed inside the tubular section 272. Still referring to FIG. 17, the lower lip 274 is configured to interact with an upper rim 286 of another embodiment of a grommet 290, such that an increased threshold of insertion force is generated by the overlapping dimensions of the lower lip 274 and the upper rim 286.

Figure 18:
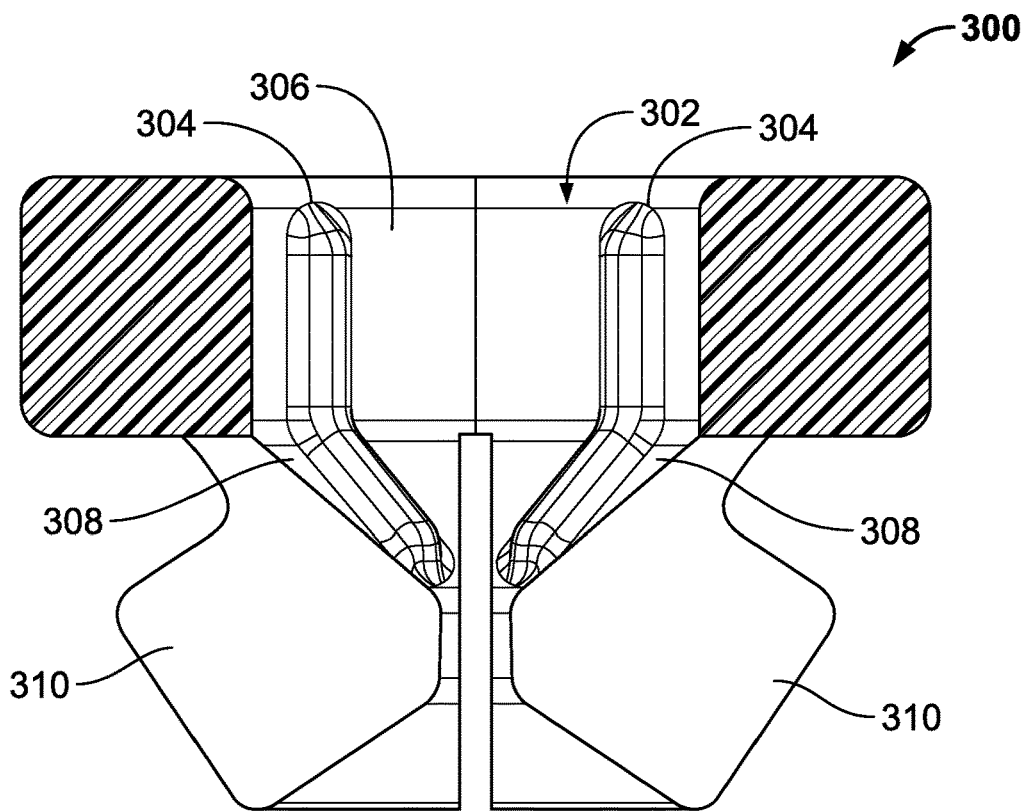
FIG. 18 is a cross-sectional view of another embodiment of a grommet for a fastener assembly.

Referring to FIG. 18, still another embodiment of a grommet 300 includes an interior passage 302 having a plurality of ridges 304 vertically disposed along an interior wall 306 and extending onto an interior flap wall 308 formed on each of a plurality of flaps 310. Each ridge 304 provides an increase in the amount of friction and retention forces experienced when the limiter 130 is inserted through the grommet 300. The ridges 304 may be formed as rounded, elliptical configurations, and can further be integrally or separately manufactured.

Figure 19:
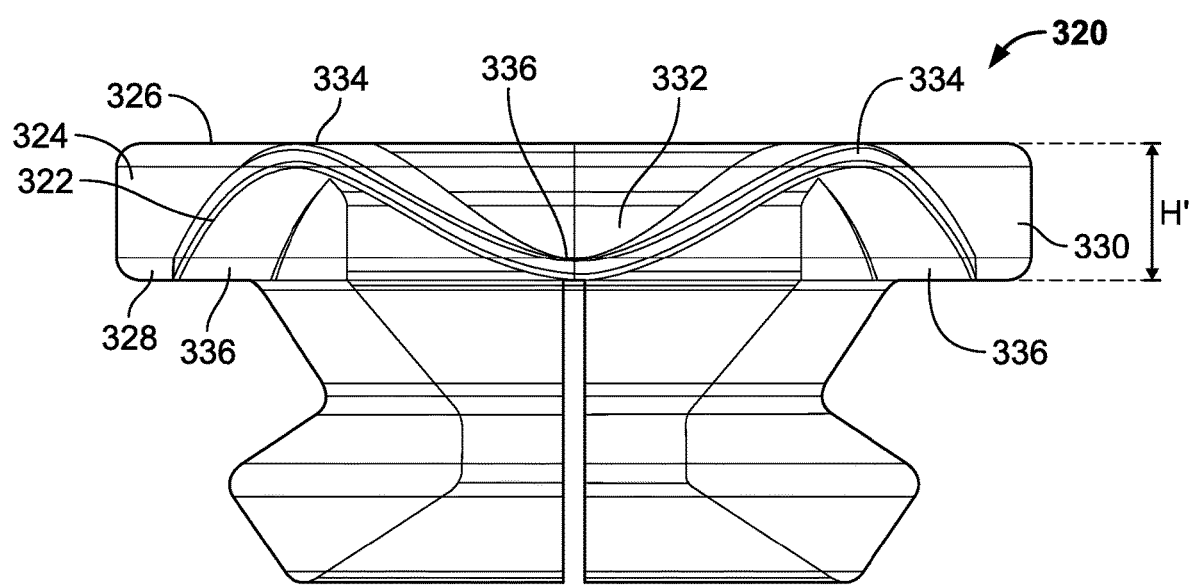
FIG. 19 is a side elevational view of another embodiment of a grommet for a fastener assembly, which is shown as transparent for purposes of clarity.

Referring to FIG. 19, yet another embodiment for a grommet 320, illustratively shown being transparent, includes a waveshear washer 322 disposed internal to a grommet ring 324. The grommet ring 324 has a ceiling 326 and a floor 328, with an external ring wall 330 connecting the ceiling 326 to the floor 328 at an outer diameter and an internal ring wall 332 connecting the same at an inner diameter. A height H' of the grommet ring 324 is the distance between the ceiling 326 and the floor 328. The waveshear washer 322 is embedded inside the grommet ring 324 equidistant from the ceiling 326 and the floor 328, and further positioned equidistant from the external ring wall 330 and the internal ring wall 332. The waveshear washer 322 follows a parabolic pattern along its elongate, cylindrical dimension with a plurality of peaks 334 and a plurality of valleys 336 therealong.

Still referring to FIG. 19, the waveshear washer 322 improves stiffness and resistance to fatigue, thereby increasing a useful life of the grommet 320. It is contemplated that the waveshear washer 322 may be molded into the grommet ring 324; however, a variety of well-known manufacturing techniques may be used alternatively or additionally. Optionally, the waveshear washer 322 may be biased toward the ceiling 326 or toward the floor 328 of the grommet ring 324 to alter the stiffness and fatigue performance characteristics of the grommet 320 during use. Similarly, the waveshear washer 322 may be biased toward the external ring wall 330 or the internal ring wall 332.

Figure 20:
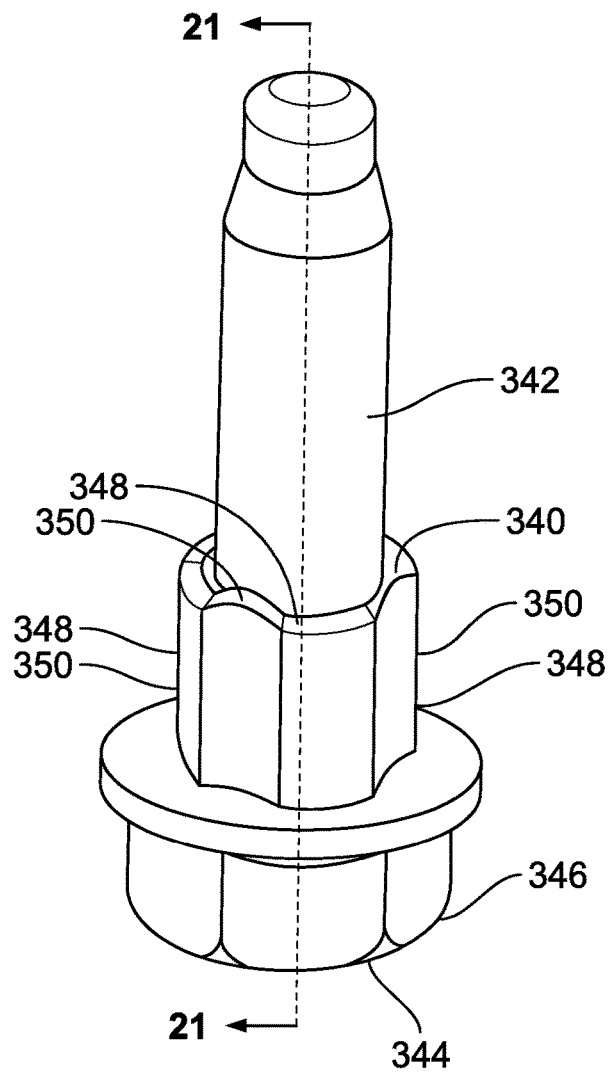
FIG. 20 is an isometric view of another embodiment of a bolt for a fastener assembly, the bolt having received a bolt retainer.
Figure 21:
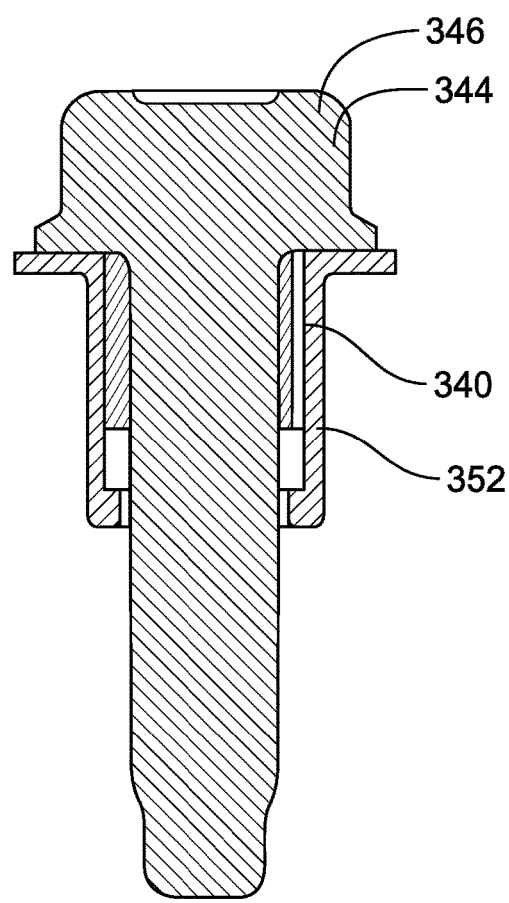
FIG. 21 is a cross-sectional view of the bolt fastener and bolt retainer of FIG. 20, further including another embodiment of a limiter.

Referring to FIGS. 20 and 21, in another embodiment, a bolt retainer 340, such as an AXI-RAD® thermoplastic retainer or a CAPFAST® retainer, can be provided around a shaft section 342 of a bolt fastener 344, just below a head portion 346. The bolt retainer 340 can have a plurality of retainer sections 348 that extend vertically and interconnect along a plurality of retainer edges 350. The plurality of retainer sections 348 may alternate in thickness, as can be appreciated from FIG. 20. A user may insert the bolt retainer 340 around the shaft section 342 of the bolt fastener 344 prior to inserting the combination of such components into a limiter device 353, as illustrated in FIG. 21.

Figure 22:
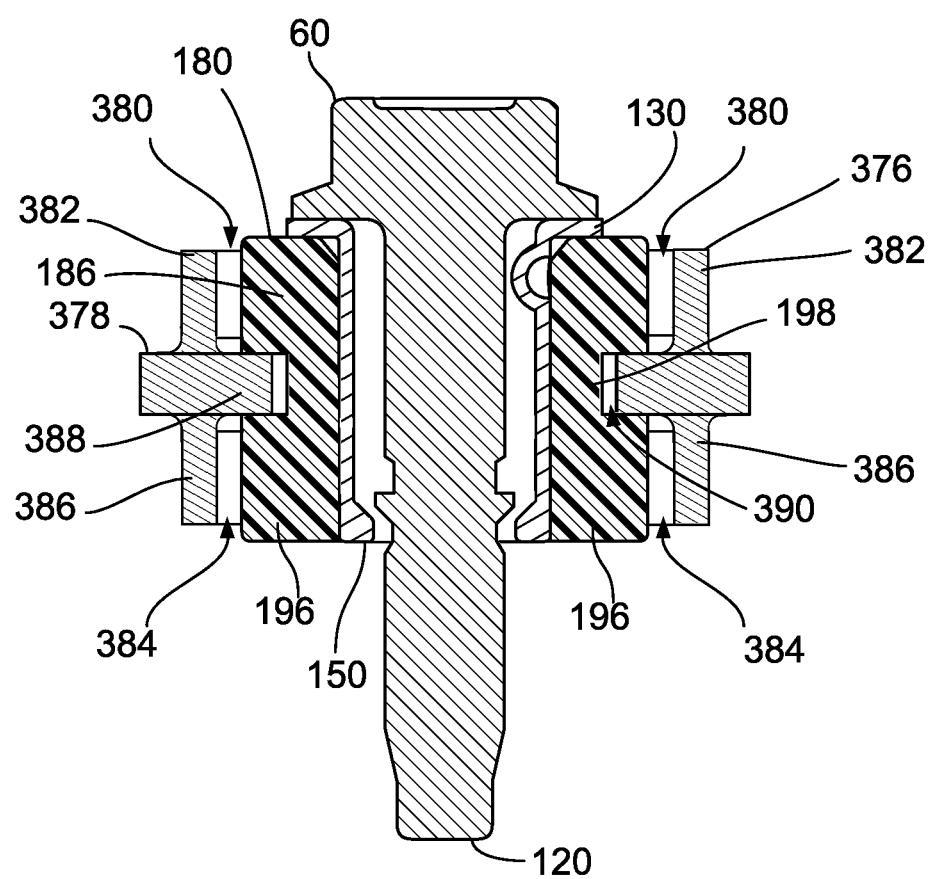
FIG. 22 is a cross-sectional view of another embodiment of a fastener assembly similar to the fastener assembly of FIGS. 8-11, further including another embodiment of a component.

Now referring to FIG. 22, another example of a fastener assembly, similar to the fastener assembly of FIGS. 8-11, may further include a component 378 having a well 376 formed therein or thereon. Like reference numbers are used to indicate like elements. The well 376 can be formed in the component 378 and configured to receive a fastener assembly including the expanding grommet 180. The fastener assembly of FIG. 22 is depicted in an assembled and uncompressed state, e.g., torque has not yet been applied to the bolt 60. The well 376 may include an upper pocket 380 and a lower pocket 384, both having diameters greater than that of the grommet 180 to allow a space or tolerance for the grommet to further expand during compression. The upper pocket 380 can be formed by an upper sidewall 382 that extends annularly around an aperture 390 of the component 378. The aperture of the component 390 can be surrounded by a medial flange 388 that contacts the arms 198 of the grommet 180. Due to the limiter 130 and the leading end 120 of the bolt 60 occupying an assembled state, tabs 196 of the grommet 180 have been expanded within the lower pocket 384. The lower pocket 384 can be formed by a lower sidewall 386 that extends annularly around the aperture 390 and opposite the upper sidewall 382. When compressed, the grommet 180 will expand within each of the upper pocket 380 and the lower pocket 384, such that the grommet 180 will displace laterally into contact with the upper and lower sidewalls 382, 386. In this manner, shear load experienced by the grommet 180 will be distributed among the grommet top section 186 and the plurality of tabs 196, such that the shear load experienced by the arms 198 can be reduced. By reducing the shear load at the arms 198, the grommet 180 may resist fatigue and failure more effectively. Further, because the tabs 196 of the grommet 180 are retained by the lower sidewall 386, the pressure exerted on the bolt 60 can be increased and therefore a greater vertical clamp load may be attained.

It is contemplated that the upper and lower pockets 380, 384 may have equal volumes or different volumes. In addition, the upper and lower sidewalls 382, 386 may extend vertically from the component 378 or can be disposed at various angles. The upper and lower sidewalls 382, 386 may further include a thickness that tapers annularly or vertically, or some combination thereof. The component 378 and the well 376 may be formed of plastic, metal, composite, or any other suitable material. Also, the component 378 and the well 376 may be composed of similar materials, or different materials, as desired.

Other embodiments of the disclosure including all the possible different and various combinations of the individual features of each of the foregoing described embodiments and examples are specifically included herein.

INDUSTRIAL APPLICABILITY

Numerous modifications to the present invention will be apparent to those skilled in the art of fastener assemblies in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A fastener assembly configured to securely couple to a component, the fastener assembly comprising:
a bolt having a head, a shaft, and a medial ridge disposed around a portion of the shaft;
a limiter having a brim and a tube, the tube extending away from the brim; and
a grommet having a central passage extending through a top section, wherein the top section further includes a central wall and a bottom surface, and wherein at least one tab extends from the bottom surface, the at least one tab including a body and an arm extending inwardly between the body and the bottom surface of the top section, wherein the body of the at least one tab includes a bottom edge, a top edge, a pair of sidewalls, and an inner wall, and wherein the body is positioned inward relative to the central wall.

2. The fastener assembly of claim 1, wherein the at least one tab extends at an angle from the bottom surface of the grommet.

3. The fastener assembly of claim 1, wherein the inner wall is curvilinear and continuous across the arm and the body.

4. The fastener assembly of claim 1, wherein the limiter further includes at least one bolt capturing mechanism.

5. The fastener assembly of claim 4, wherein the at least one bolt capturing mechanism is at least one nib disposed on an inner surface.

6. The fastener assembly of claim 4, wherein the at least one bolt capturing mechanism is a plurality of intrusions and lobes formed along a crimped section.

7. The fastener assembly of claim 4, wherein the limiter further includes at least one grommet capturing mechanism.

8. The fastener assembly of claim 7, wherein the at least one grommet capturing mechanism is at least one rib disposed on an outer barrel surface of the limiter.

9. The fastener assembly of claim 7, wherein the at least one grommet capturing mechanism is a lower lip positioned at a lower end opposite the brim that is configured to interact with an upper rim disposed inside the central passage of the grommet.

10. A fastener assembly, comprising:
a grommet including a top section having a top surface and a central passage defined by a central wall, wherein the grommet includes at least one tab including a body and an arm extending inwardly between the body and a bottom surface of the top section, and wherein the body of the at least one tab includes a bottom edge, a top edge, a pair of sidewalls, and an inner wall, and wherein the body is positioned inward relative to the central wall;
a limiter including a barrel and a flange, the barrel having an inner passage; and
a fastener including a shaft, wherein the fastener is configured to be received and retained within the inner passage of the limiter, wherein the barrel is configured to be received and retained by the central passage of the grommet, and wherein the combination of the grommet, the limiter and the fastener are configured to be received by a component in a pre-fastened state.

11. The fastener assembly of claim 10, wherein the at least one tab of the grommet includes a plurality of tabs each having the inner wall positioned below the central wall of the central passage.

12. The fastener assembly of claim 11, wherein the grommet further includes a ridge extending vertically within the central passage and along the central wall.

13. The fastener assembly of claim 12, wherein the ridge extends along the inner wall of each of the plurality of tabs.

14. The fastener assembly of claim 11, wherein the top section of the grommet includes a washer disposed therein.

15. The fastener assembly of claim 10, wherein a retainer is disposed around the shaft of the fastener, the retainer having at least one thick panel and at least one thin panel.

16. The fastener assembly of claim 15, wherein the retainer is disposed inside the inner passage of the limiter.

17. The fastener assembly of claim 10, wherein a component includes a well configured to receive the fastener assembly, and wherein the well includes an upper pocket and a lower pocket.

18. A fastener assembly, comprising:
a bolt including a head and a shaft, the shaft further including a collar disposed around the shaft;
a grommet including a top section and a central wall forming a central passage extending through the top section, wherein the grommet includes at least one tab including a body and an arm extending inwardly between the body and a bottom surface of the top section, and wherein the body of the at least one tab includes a bottom edge, a top edge, a pair of sidewalls, and an inner wall, and wherein the body is positioned inward relative to the central wall; and
a limiter including a tube, the tube having a flange disposed at a top end, wherein the limiter further includes a plurality of protuberances projecting inwardly from an inner surface of the tube, wherein the at least one tab of the grommet includes a plurality of tabs disposed below the top section, and wherein the top section of the grommet is configured to couple to a top surface of a component and the plurality of tabs are configured to couple to a bottom surface of the component.

* * * * *